(12) United States Patent
Walker et al.

(10) Patent No.: US 6,870,338 B2
(45) Date of Patent: Mar. 22, 2005

(54) MAGNETIC ENCODER FOR POWERED WINDOW COVERING

(75) Inventors: Winston Glenn Walker, Littleton, CO (US); Norman C. Walker, Solana Beach, CA (US)

(73) Assignee: Harmonic Design, Inc., Los Angeles, CA (US)

( * ) Notice: Subject to any disclaimer, the term of this patent is extended or adjusted under 35 U.S.C. 154(b) by 0 days.

(21) Appl. No.: 10/460,596

(22) Filed: Jun. 11, 2003

(65) Prior Publication Data

US 2004/0011477 A1 Jan. 22, 2004

Related U.S. Application Data

(63) Continuation-in-part of application No. 10/272,640, filed on Oct. 16, 2002, and a continuation-in-part of application No. 10/062,895, filed on Feb. 1, 2002.

(51) Int. Cl.[7] ................................................. G05D 3/00
(52) U.S. Cl. ................... 318/466; 318/366; 160/176.1; 160/133; 188/267; 310/77
(58) Field of Search ................................ 318/466, 366, 318/470, 468; 160/133, 176.1; 188/267; 310/77, 27, 231, 232

(56) References Cited

U.S. PATENT DOCUMENTS

| 3,352,349 | A | | 11/1967 | Hennequin | 160/171 |
| 3,584,274 | A | * | 6/1971 | Dimitrios et al. | 318/138 |
| 3,715,650 | A | * | 2/1973 | Draxler | 322/51 |
| 3,961,214 | A | * | 6/1976 | Lokkart | 310/155 |
| 4,444,444 | A | * | 4/1984 | Benedetti et al. | 310/90.5 |
| 4,522,244 | A | | 6/1985 | Brolin | 160/170 |
| 4,623,012 | A | | 11/1986 | Rude et al. | 160/243 |
| 5,184,660 | A | | 2/1993 | Jelic | 160/171 |
| 5,228,491 | A | | 7/1993 | Rude et al. | 160/171 |
| 5,848,634 | A | | 12/1998 | Will et al. | 160/310 |
| 5,990,646 | A | * | 11/1999 | Kovach et al. | 318/468 |
| 6,181,089 | B1 | * | 1/2001 | Kovach et al. | 318/16 |
| 6,201,364 | B1 | * | 3/2001 | Will et al. | 318/466 |
| 6,369,530 | B2 | * | 4/2002 | Kovach et al. | 318/16 |

FOREIGN PATENT DOCUMENTS

| DE | 29509638 U1 | 11/1996 | E05F/15/10 |
| EP | 0381643 A1 | 8/1990 | E06B/9/82 |
| EP | 0859224 A2 | 8/1998 | G01L/3/14 |
| JP | 29028 | 2/1983 | 1/66 |
| JP | 109484 | 6/1985 | 9/32 |
| JP | 192987 | 8/1989 | 9/32 |
| JP | 363495 | 12/1992 | 9/264 |

* cited by examiner

*Primary Examiner*—Rita Leykin
(74) *Attorney, Agent, or Firm*—John L. Rogitz

(57) ABSTRACT

A small permanent magnet is affixed to the protruding portion of a rotor of a motor that is coupled to gears in a gear enclosure. The rod of a window covering is coupled to the gears such that when the motor is energized by a user command signal, the window covering moves. At least one pick-up coil is affixed to the receptacle of the gear enclosure, such that when the motor with magnet turns, the pick-up coil senses magnetic pulses that can be used to determine the speed, position, and direction of rotation of the motor.

20 Claims, 4 Drawing Sheets

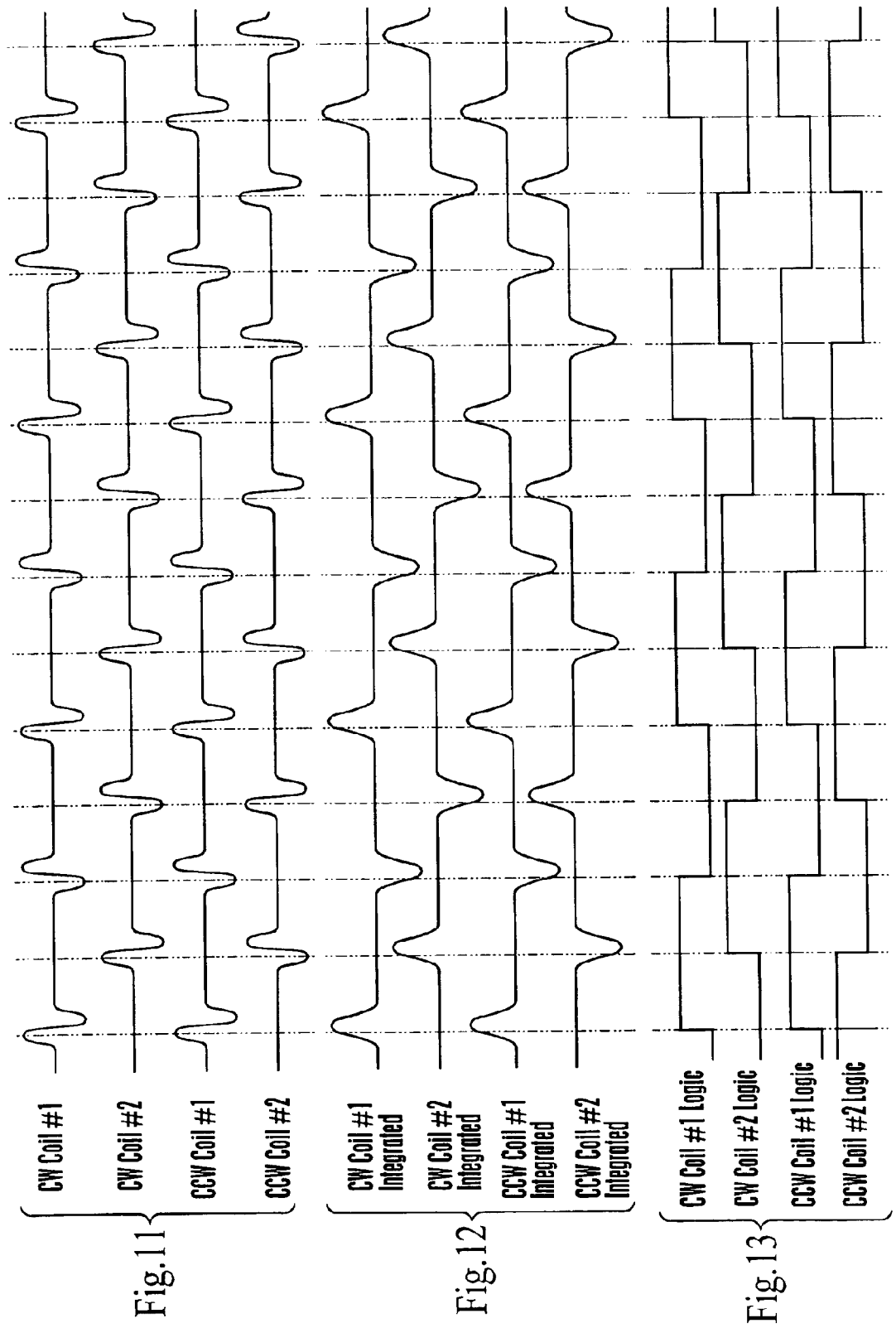

MAGNETIC ENCODER FOR POWERED WINDOW COVERING

RELATED APPLICATIONS

The present application is a continuation in part of and claims priority from co-pending U.S. patent applications Ser. Nos. 10/062,895, filed Feb. 1, 2002, and Ser. No. 10/272,640, filed Oct. 16, 2002, both of which are incorporated herein by reference.

FIELD OF THE INVENTION

The present invention relates generally to motorized window coverings, awnings, security screens, projection screens, and the like.

BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering. Such assemblies are disclosed in U.S. Pat. No. 6,433,498, incorporated herein by reference.

The parent applications provide inventions for determining the position of the window coverings based on counting motor pulses. By knowing the position of the window coverings, features such as automatic repositioning the window covering to a preset position can be provided. The present invention likewise provides structure and methods for determining not only the position of an object such as a window covering, projector screen, awning, and the like being driven by a motor, but also under some circumstances the speed and direction of rotation of the motor.

SUMMARY OF THE INVENTION

A powered assembly includes an object that can be moved between a raised configuration and a lowered configuration. The assembly also includes a motor, and an actuator coupled to the motor and the object to move the object when the motor is energized, with the motor and actuator defining a rotating member. A permanent magnet is affixed to the rotating member, preferably to the motor rotor, and at least one pick-up coil is stationarily juxtaposed with the rotating member for generating pulses as the magnet rotates past the coil.

In preferred non-limiting embodiments, the motor may be powered by at least one dc battery and the object may be a window covering. Two coils may be provided in quadrature with each other. Further, two pair of quadrature coils may be provided.

In another aspect, a drive assembly for a movable object including a rod includes an electrically-powered drive structure couplable to the rod to move the object when the drive structure is energized to move at least one rotatable component of the drive structure. A first braking magnet is attached to a rotating component of the drive structure. Also, a coil is juxtaposed with the magnet to output a signal representative at least of a speed of rotation.

In still another aspect, a power assembly for an object having at least one operator includes power means, motor means energized by the power means, and means for coupling the motor means to the operator. Magnetic means are on the motor means and are coupled to the coupling means for braking the object when the motor means is de-energized, and for generating pulses that are useful for determining at least a speed or position of the object.

In another aspect, a drive assembly for a movable object including a rod includes an electrically-powered drive structure couplable to the rod to move the object when the drive structure is energized to move at least one rotatable component of the drive structure. A rotor of magnetic material formed such that the magnetic path through diameters at various angles is not uniform is attached to a rotating component of the drive structure. Also, a coil is juxtaposed with a magnet attached to a fixed member of the drive structure to output a signal representative at least of a speed of rotation.

In still another aspect, a drive assembly for a movable rod includes at least one coil positioned on a rotor of the drive assembly, and at least one permanent magnet affixed to a non-moving member of the drive assembly. Slip rings convey the signal generated by the coil.

The details of the present invention, both as to its construction and operation, can best be understood in reference to the accompanying drawings, in which like numerals refer to like parts, and which:

BRIEF DESCRIPTION OF THE DRAWINGS

FIG. 11 is a waveform diagram showing the signals generated by the quadrature coils;

FIG. 12 is a waveform diagram showing the signals generated by the quadrature coils after integration;

FIG. 13 is a waveform diagram showing the signals generated by the quadrature coils after conversion to quadrature signals;

DETAILED DESCRIPTION OF THE PREFERRED EMBODIMENT

Figure 1:
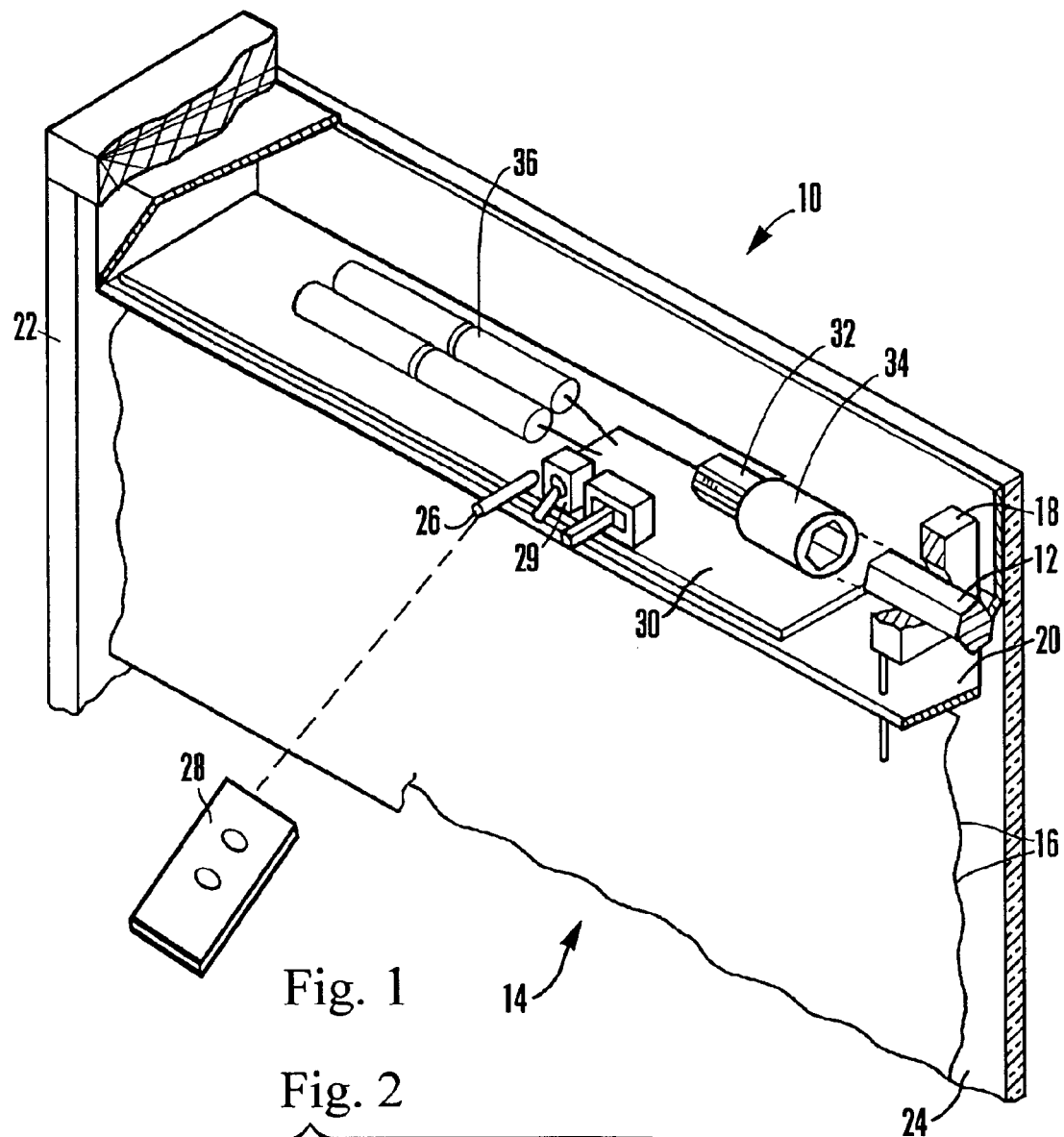
FIG. 1 is a perspective view of a window covering actuator, shown in one intended environment, with portions of the head rail cut away.

Referring initially to FIG. 1, a motorized window covering is shown, generally designated 10, that includes an actuator such as a rotatable rod 12 of a window covering 14, such as but not limited to a shade assembly having raisable (by rolling up) and lowerable (by rolling down, or unrolling) shade 16. As shown, the tilt rod 12 is rotatably mounted by means of a block 18 in a head rail 20 of the window covering 14.

While a roll-up shade is shown, it is to be understood that the principles herein apply to a wide range of window coverings and other objects that are to be moved by motors. For example, the invention applies to raisable and lowerable pleated shades and cellular shades such as those commonly marketed under the trade names "Silhouette", "Shangri-La", etc. as well as to projector screens, awnings, etc. that can be raised and lowered. Moreover, while needed less in applications that require only tilting slats such as in horizontal blinds, the invention may also apply to these systems. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art, such as by manipulable manual switches 29. The user command signals can include open, close, raise, lower, and so on.

An electronic circuit board 30 can be positioned in the head rail 20 and can be fastened to the head rail 20, e.g., by screws (not shown) or other well-known method. The preferred electronic circuit board 30 includes a microprocessor for processing the control signals. Also, the circuit board 30 includes appropriate signal conditioning circuitry that is electrically connected to the below-disclosed pick-up coils for processing signals from the coils and sending the signals to the processor on the circuit board 30 for determining the position and/or speed and/or direction of rotation of the below-described motor as set forth further below.

Indeed, FIG. 1 shows that a small, lightweight electric motor 32 is coupled to a gear enclosure 34, preferably by bolting the motor 32 to the gear enclosure 34. The gear enclosure 34 is keyed to the rod 12, so that as the gears in the gear enclosure 34 turn, the rod 12 rotates.

It is to be understood that the motor 32 is electrically connected to the circuit board 30. To power the motor 32, one or more (four shown in FIG. 1) primary dc batteries 36, such as type AA alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As set forth in the above-referenced U.S. Patent, a user can manipulate the signal generator 28 to generate a signal that is sensed by the signal sensor 26 and sent to signal processing circuitry in the circuit board 30. In turn, the electrical path between the batteries 34 and the motor 32 is closed to energize the motor 32 and move the window covering open or closed in accordance with the signal generated by the signal generator 28, under control of the processor on the electronic circuit board 30.

Figure 2:
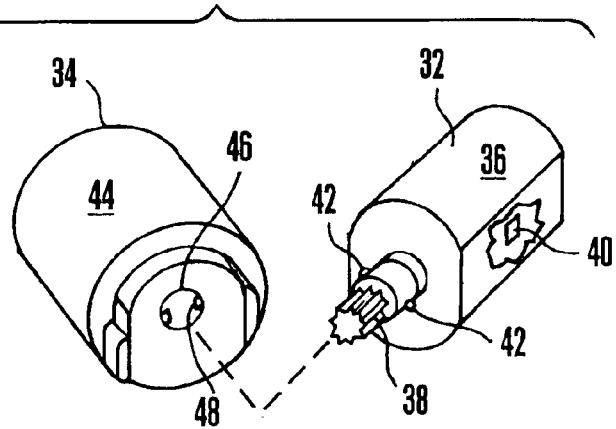
FIG. 2 is an exploded perspective view of a non-limiting exemplary motor and gearbox, showing the braking magnets and pick-up coils, with portions cut away.

Now referring to a non-limiting illustrative embodiment in FIG. 2, the motor 32 can be a dc motor that has a metal or plastic housing 36 containing a rotor 38, a portion of which extends beyond the housing 36 and is configured as a gear. DC motor components known in the art, e.g., an armature and one or more field magnets 40 (permanent magnets and/or electromagnets to establish the requisite magnetic field), are contained within the housing 36. If desired, the motor 32 can be an ac motor and the circuit board 30 can contain appropriate power conversion circuitry.

As shown in FIG. 2, on the portion of the rotor 38 that protrudes beyond the housing 36, at least one braking magnet pole 42 (two shown) is affixed by, e.g., solvent bonding or welding or brazing or soldering, or by any other means incorporating it into the rotor. The braking magnet poles 42 can be established by a small permanent magnet. Less desirably, the magnets of the present invention can be electromagnets, but that would require the addition of slip rings and brushes, and is thus not as desirable as using permanent magnets.

Turning to the gear enclosure 34, a housing 44 of the gear enclosure 34 can support gears in accordance with the principles set forth in the above-referenced U.S. Patent. Also, the housing 44 is formed with a receptacle 46, and the gear-shaped portion of the rotor 38 is received within the receptacle 46. The receptacle 46 includes structure for coupling with the rotor 38. Also, the receptacle 46 can include one or more permanent or electro magnets or be made of a ferromagnetic material.

At least one pick-up coil 48 (two shown) is affixed to the housing 44 of the gear enclosure 34 within the receptacle 46 by, e.g., solvent bonding or welding or brazing or soldering, or by any other means of incorporating them into the enclosure or fixed member of the actuator 10. Each pick-up coil 48 includes a wire wound around a core and two leads that extend from the coil and that are coupled through suitable electrical circuitry to the processor on the circuit board 30 (FIG. 1).

With this combination of structure, when the motor 32 is de-energized, the braking magnet poles 42 of the motor 32 are attracted to the braking magnets and/or magnetic elements such as ferrite or other material on, e.g., the gear enclosure 34 in at least one position of rotation of the rotor, resulting in a magnetic coupling. These magnetic couplings brake the rod 12 from turning under the weight of the window covering 14 when the motor 32 is de-energized.

Additionally, with this structure, as the rotor with magnet rotates, electrical pulses are output by the pick-up coils 48 and sent to the processor on the circuit board 30 for use as set forth below to determine the position and/or speed and/or direction of rotation of the motor.

While the preferred embodiment disclosed above has a braking magnet on the extension of the rotor 38 that protrudes from the motor housing, the present braking magnet can be affixed to other components of powered drive trains that can encompass motors, actuators, and intervening components such as gears. Such other components can include, e.g., satellite gear carrier plates (in planetary gear systems), worm drives, metal/magnetic axles, drive rods, and other rotating components that are closely juxtaposed with stationary structure on which pick-up coils can be mounted.

Figure 3:
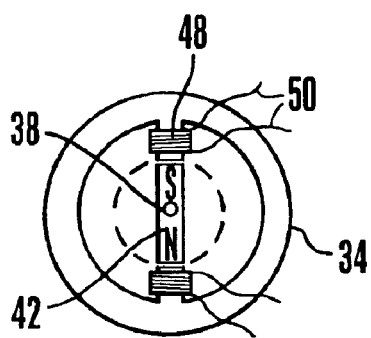
FIG. 3 is a schematic diagram of the pick-up coil arrangement shown in FIG. 2.

FIG. 3 schematically shows the above pulse generating structure. As shown, each of the coils 48 includes two leads 50 that are electrically connected to the electrical circuit board 30 (FIG. 1) for processing as described below. The coils 48 can be provided with suitable laminations.

FIGS. 4–10 schematically show various arrangements that can be implemented in accordance with present principles, showing motor rotors that can be similar or identical to the rotor 38 shown in FIG. 2, labelling north and south poles of permanent magnets "N" and "S", and indicating the plane of rotation of the rotor in dashed circular lines.

Figure 4:
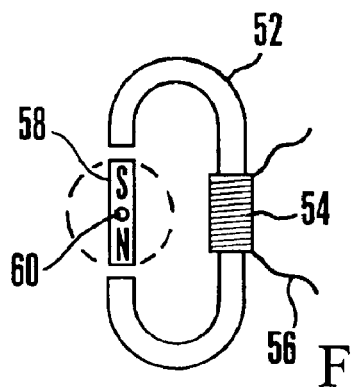
FIG. 4 is a schematic diagram of an alternate pick-up coil arrangement with a racetrack-shaped stationary element.

Commencing with FIG. 4, a stationary generally racetrack-shaped magnetic or ferromagnetic element 52 has a wire coil 54 wrapped around a portion of it. Two leads 56 extend from the coil 54 to the circuit board 30. A permanent magnet 58 is attached to a rotor 60 of a motor between the open ends of the element 52 as shown, and as the rotor 60 with magnet 58 rotates, electrical pulses are generated in the coil 54. The pulses are sent to the circuit board 30 for processing as described below.

Figure 5:
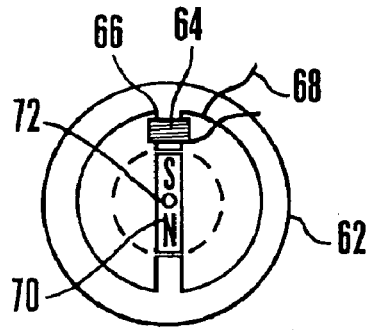
FIG. 5 is a schematic diagram of another alternate pick-up coil arrangement with a circular-shaped stationary element and a single coil.

FIG. 5 shows a stationary generally circular-shaped magnetic or ferromagnetic element 62 (for use in, e.g., tubular head rails) that has a wire coil 64 wrapped around a radially extending land 66 of the element 62. The signal output is proportional to the number of turns in the coil, so for a given size of coil and a given wire size, the arrangement shown in FIG. 5 produces one half the signal provided by the arrangement shown in FIG. 3 by virtue of providing twice the volume for coils. Two leads 68 extend from the coil 64 to the circuit board 30. A permanent magnet 70 is attached to a rotor 72 of a motor within the circumference of the element 62, and as the rotor 72 with magnet 70 rotates, electrical pulses are generated in the coil 64. The pulses are sent to the circuit board 30 for processing as described below.

Figure 6:
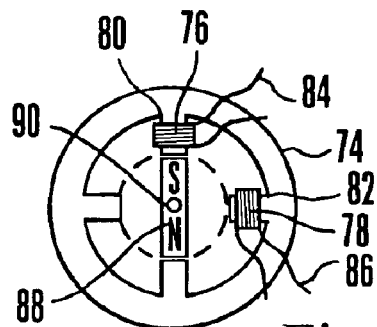
FIG. 6 is a schematic diagram of another alternate pick-up coil arrangement with a circular-shaped stationary element and two coils in quadrature.

FIG. 6 shows a stationary generally circular-shaped magnetic or ferromagnetic element 74 that has first and second wire coils 76, 78 wrapped around respective radially extending lands 80, 82 of the element 74 in quadrature. The lands 80, 82 (and, hence, the coils 76, 78) are spaced 90° from each other. Two leads 84, 86 respectively extend from the coils 76, 78 to the circuit board 30. A permanent magnet 88 is attached to a rotor 90 of a motor within the periphery of the element 92, and as the rotor 90 with magnet 88 rotates, electrical pulses are generated in the coils 76, 78. The pulses are sent to the circuit board 30 for processing as described below.

Figure 7:
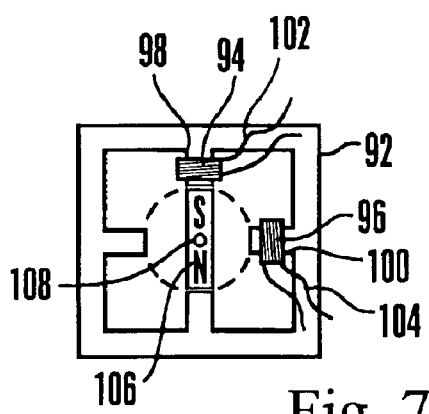
FIG. 7 is a schematic diagram of another alternate pick-up coil arrangement with a square-shaped stationary element and two coils in quadrature.

FIG. 7 shows a stationary generally square-shaped magnetic or ferromagnetic element 92 (for use in, e.g., parallelepiped-shaped head rails) that has first and second wire coils 94, 96 wrapped around respective radially extending lands 98, 100 of the element 92 in quadrature. The lands 98, 100 are spaced 90° from each other. Two leads 102, 104 respectively extend from the coils 94, 96 to the circuit board 30. A permanent magnet 106 is attached to a rotor 108 of a motor within the periphery of the element 92, and as the rotor with magnet rotates, electrical pulses are generated in the coils 94, 96. The pulses are sent to the circuit board 30 for processing as described below.

Figure 8:
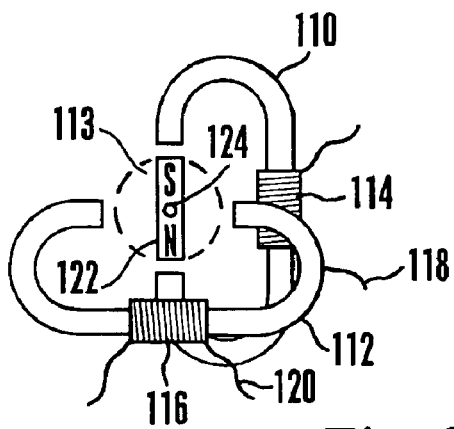
FIG. 8 is a schematic diagram of another alternate pick-up coil arrangement, with two racetrack-shaped elements each bearing a coil.

FIG. 8 shows two stationary generally racetrack-shaped magnetic or ferromagnetic elements 110, 112 oriented at 90° relative to each other, with their open ends collectively defining a space 113 and with the coils 114, 116 effectively being in quadrature with each other. Each element 110, 112 has a respective wire coil 114, 116 wrapped around a portion of it. Two respective leads 118, 120 extend from the coil 54 to the circuit board 30. A permanent magnet 122 is attached to a rotor 124 of a motor within the space 113, and as the rotor with magnet rotates, electrical pulses are generated in the coils 114, 116 and sent to the circuit board 30 for processing as described below.

Figure 9:
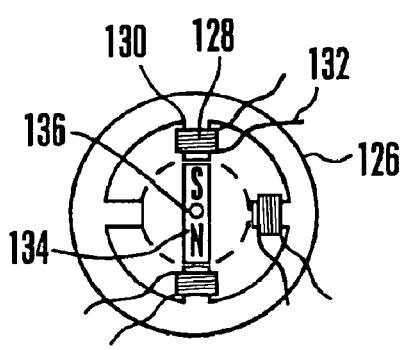
FIG. 9 is a schematic diagram of another alternate pick-up coil arrangement with a circular-shaped stationary element and four coils.

FIG. 9 shows a stationary generally circular-shaped magnetic or ferromagnetic element 126 that has first through fourth wire coils 128 wrapped around respective radially extending lands 130 of the element 126 in quadrature pairs to provide a signal having twice the amplitude of the signal provided by the arrangement shown in FIG. 6. The lands 130 are spaced 90° from each other. Two leads 132 respectively extend from each of the coils 128 to the circuit board 30. A permanent magnet 134 is attached to a rotor 136 of a motor within the periphery of the element 126, and as the rotor with magnet rotates, electrical pulses are generated in the coils 128 and are sent to the circuit board 30 for processing as described below.

Figure 10:
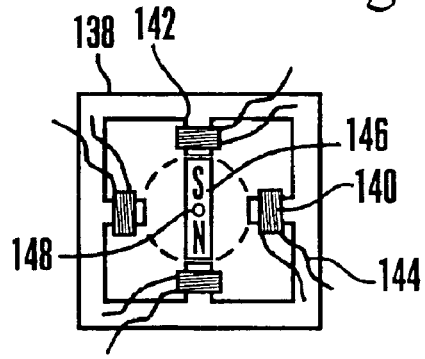
FIG. 10 is a schematic diagram of another alternate pick-up coil arrangement with a square-shaped stationary element and four coils.

FIG. 10 shows a stationary generally square-shaped magnetic or ferromagnetic element 138 that has first through fourth wire coils 140 wrapped around respective radially extending lands 142 of the element 138 in quadrature pairs to provide a signal having twice the amplitude of the signal provided by the arrangement shown in FIG. 7, for a given wire and coil size, because the signals in the two coils, which are substantially equal, can be added together. The lands 142 are spaced 90° from each other. Two leads 144 respectively extend from each of the coils 140 to the circuit board 30. A permanent magnet 146 is attached to a rotor 148 of a motor within the periphery of the element 138, and as the rotor with magnet rotates, electrical pulses are generated in the coils 140 and are sent to the circuit board 30 for processing as described below.

FIGS. 11–13 respectively show the waveforms generated in the coils of FIGS. 9 and 10, the waveforms after integration by suitable integrating circuitry, and the waveforms after conversion to quadrature signals by circuitry known in the art. It is to be understood that for a single coil embodiment (FIGS. 4 and 5), only two of the four waveforms shown in FIG. 11 will be output, one for clockwise and one for counterclockwise, since either coil #1 or coil #2 have been eliminated; for two coils arranged in series (FIG. 3), the two waveforms will be identical in shape to those from the arrangement of FIGS. 4 and 5, but will be able to produce an output of greater amplitude. For two coils arranged in quadrature (FIGS. 6, 7, and 8) all four waveforms will be output; and for four coil arrangements having two pair of quadrature coils (FIGS. 9 and 10), all of the waveforms are output, but at a greater amplitude than the arrangements in FIGS. 6, 7, and 8.

FIG. 12 shows the waveforms of FIG. 11 after they have been integrated. FIG. 13 shows the results of converting the signals of FIG. 12 to quadrature signals.

With the above signal processing in mind, the speed of the motor can be determined using a single coil (i.e., by any of the arrangements shown in FIGS. 3–10), because each coil outputs two pulses each revolution of the motor, and the speed of rotation is equal to the speed of the motor adjusted for gearing (if any) between the encoder and motor. If the direction of the motor is known (by, for example, determining whether a "raise" or "lower" signal was received), then motor position (and, hence, window covering position) can also be known simply by adding pulses or subtracting pulses from an absolute pulse count (e.g., an initial count known to correspond to a particular window covering configuration) as appropriate. If the direction of rotation is not known, then the use of any of the quadrature-configured arrangements (FIGS. 6–10) can provide the necessary information simply by observing the signal sequence and timing between signals from the coils. For example, as can be appreciated looking at FIG. 13, when the rotor 90 in FIG. 6 is rotating clockwise, the signal derived from coil 76, called "coil #1" logic in FIG. 13, leads the signal derived from coil 78, called "coil #2" logic in FIG. 13, by 90° of mechanical motion. Conversely, when the rotor 90 in FIG. 6 is rotating counterclockwise, the signal derived from coil 76 lags the signal derived from coil 78 by 90° of mechanical motion.

Figure 14:
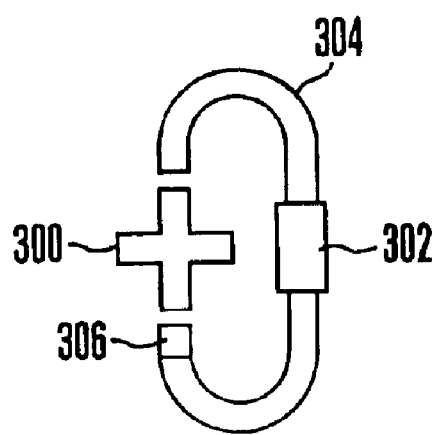
FIG. 14 is a schematic diagram of another alternate pick-up coil arrangement with a ferromagnetic rotor.

It is to be understood that any of the rotating magnet rotors above may be replaced by magnetic material that is not necessarily a permanent magnet. Also, any of the rotors above may be cruciform-shaped. To illustrate, FIG. 14 shows a cruciform-shaped rotor or rotor extension 300 that is magnetic (e.g., ferromagnetic) but that is not a permanent magnet. One or more coils (only a single coil 302 shown for clarity) on a magnetic stationary C-shaped core 304 is juxtaposed with a stationary magnet 306 to generate signals in accordance with the above disclosure as the rotor turns. With this structure, the magnetic path through diameters of the rotor 300 at various angles is not uniform.

Figure 15:
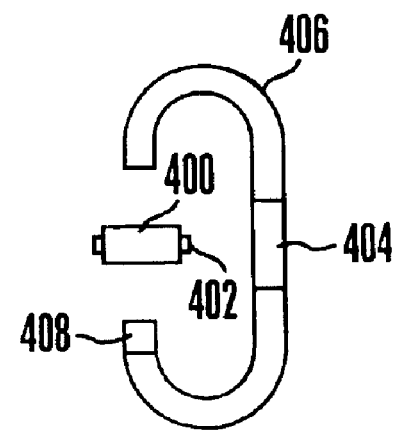
FIG. 15 is a schematic diagram of another alternate pick-up coil arrangement with the coil on the rotor.

Moreover, although requiring added complexity, as shown in FIG. 15 a coil 400 may instead be positioned on a magnetic rotor 402 with at least one permanent magnet 404 affixed to a non-moving member 406, with the signal generated by the coil 400 being conveyed to signal processing circuitry from the rotating member via slip rings 408. Further, two coils on the rotor and three slip rings would provide quadrature data.

While the particular MAGNETIC ENCODER FOR POWERED WINDOW COVERING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A powered assembly, comprising:
    at least one object that can be moved between a first configuration and a second configuration, the object being selected from the group consisting of window coverings, awnings, skylight coverings, curtains, and screens;
    at least one motor;
    at least one actuator coupled to the motor and the object to move the object when the motor is energized, the motor and actuator defining a rotating member;
    at least one permanent magnet affixed to the rotating member; and
    at least one pick-up coil stationarily juxtaposed with the rotating member for generating pulses as the magnet rotates past the coil.

2. The powered assembly of claim 1, wherein the motor is powered by at least one dc battery.

3. The powered assembly of claim 2, wherein the object is a window covering.

4. The powered assembly of claim 1, wherein the rotating member is at least a portion of a rotor of the motor.

5. The powered assembly of claim 1, wherein at least one permanent magnet is attached to the rotor.

6. The assembly of claim 1, comprising two coils in quadrature with each other.

7. The assembly of claim 1, comprising two pair of quadrature coils.

8. A drive assembly for a movable object including a rod, comprising:
    an electrically-powered drive structure couplable to the rod to move the object when the drive structure is energized to move at least one rotatable component of the drive structure;
    at least a first braking magnet attached to a rotating component of the drive structure; and
    at least one coil juxtaposed with the magnet to output a signal representative at least of a speed of rotation.

9. The assembly of claim 8, wherein the drive structure is powered by at least one dc battery.

10. The assembly of claim 9, wherein the object is selected from the group consisting of window coverings, awnings, skylight coverings, curtains, and screens.

11. The assembly of claim 8, wherein the drive structure includes at least a portion of a rotor of the motor.

12. The assembly of claim 8, wherein at least one permanent magnet is attached to the rotor.

13. The assembly of claim 8, comprising two coils in quadrature with each other.

14. The assembly of claim 8, comprising two pair of quadrature coils.

15. A power assembly for an object having at least one operator, comprising:
    power means;
    motor means energized by the power means;
    means for coupling the motor means to the operator; and
    magnetic means on the motor means and coupling means for braking the object when the motor means is de-energized, and for generating pulses useful for determining at least a speed, wherein the object is selected from the group consisting of window coverings, awnings, skylight coverings, curtains, and screens.

16. The assembly of claim 15, wherein the magnetic means includes at least one coil.

17. The assembly of claim 15, comprising two coils in quadrature with each other.

18. The assembly of claim 15, comprising two pair of quadrature coils.

19. A drive assembly for a movable rod for an object that can be moved between a first configuration and a second configuration, the object being selected from the group consisting of window coverings, awnings, skylight coverings, curtains, and screens, the drive assembly comprising:

at least one electrically-powered drive structure couplable to the rod to move the object when the drive structure is energized to move at least one rotatable component of the drive structure;

a rotor of magnetic material formed such that the magnetic path through diameters at various angles is not uniform, the rotor being attached to a rotating component of the drive structure; and at least one coil juxtaposed with a magnet attached to a fixed member of the drive structure to output a signal representative at least of a speed of rotation.

20. A drive assembly for a movable rod for an object that can be moved between a first configuration and a second configuration, the object being selected from the group consisting of window coverings, awnings, skylight coverings, curtains, and screens, the drive assembly comprising:

at least one coil be positioned on a rotor of the drive assembly;

at least one permanent magnet affixed to a non-moving member of the drive assembly; and at least one slip ring for conveying a signal generated by the coil.

* * * * *